US010219501B2

United States Patent
Takechi et al.

(10) Patent No.: US 10,219,501 B2
(45) Date of Patent: Mar. 5, 2019

(54) DUAL-BEARING REEL

(71) Applicant: Shimano Inc., Sakai, Osaka (JP)

(72) Inventors: Kunio Takechi, Osaka (JP); Takeshi Ikuta, Osaka (JP); Yohei Toake, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/801,131

(22) Filed: Nov. 1, 2017

(65) Prior Publication Data

US 2018/0199559 A1 Jul. 19, 2018

(30) Foreign Application Priority Data

Jan. 19, 2017 (JP) .................................. 2017-007310

(51) Int. Cl.
*A01K 89/01* (2006.01)
*A01K 89/033* (2006.01)
*A01K 89/015* (2006.01)

(52) U.S. Cl.
CPC ...... *A01K 89/056* (2015.05); *A01K 89/01931* (2015.05); *A01K 89/05* (2015.05)

(58) Field of Classification Search
CPC .............. A01K 89/015; A01K 89/0186; A01K 89/0189; A01K 89/01901; A01K 89/0191
See application file for complete search history.

(56) References Cited

U.S. PATENT DOCUMENTS

| 5,904,310 A * | 5/1999 | Miyazaki ........... A01K 89/0186 |
| | | 242/260 |
| 2013/0075218 A1* | 3/2013 | Takechi ............. A01K 89/015 |
| | | 192/55.1 |
| 2013/0220050 A1* | 8/2013 | Koike .................... A01K 89/00 |
| | | 74/439 |
| 2013/0233957 A1* | 9/2013 | Niitsuma ............... A01K 89/02 |
| | | 242/285 |
| 2014/0291430 A1* | 10/2014 | Takamatsu ........... A01K 89/006 |
| | | 242/283 |
| 2015/0090822 A1* | 4/2015 | Ikuta .................... A01K 89/015 |
| | | 242/261 |
| 2015/0090824 A1* | 4/2015 | Ikebukuro ............ A01K 89/015 |
| | | 242/310 |

(Continued)

FOREIGN PATENT DOCUMENTS

| EP | 2957171 A1 * | 12/2015 | ........... A01K 89/006 |
| JP | 56-2773 Y2 | 7/1981 | |
| JP | 2012-24037 A | 2/2012 | |

*Primary Examiner* — Emmanuel M Marcelo
(74) *Attorney, Agent, or Firm* — Global IP Counsiors, LLP

(57) ABSTRACT

A dual-bearing reel includes a reel body, a tubular pinion gear, a first bearing, a spool shaft, a spool attached to the spool shaft, and a clutch mechanism. The first bearing member supports an outer perimeter surface of a first end portion of the pinion gear. The spool shaft extends through an interior of the pinion gear and is rotatably supported in the reel body. The clutch mechanism is configured to switch between a clutch on state to connect the pinion gear and the spool shaft, and a clutch off state to release the connection between the pinion gear and the spool shaft. The spool shaft includes a support portion configured to support an inner perimeter surface of a second end portion of the pinion gear in the clutch on state.

8 Claims, 4 Drawing Sheets

(56) References Cited

U.S. PATENT DOCUMENTS

| | | | |
|---|---|---|---|
| 2015/0115087 A1* | 4/2015 | Ohara | F16C 32/0406 242/223 |
| 2015/0181853 A1* | 7/2015 | Niitsuma | A01K 89/015 242/257 |
| 2016/0174537 A1* | 6/2016 | Takechi | A01K 89/015 242/321 |

* cited by examiner

DUAL-BEARING REEL

CROSS-REFERENCE TO RELATED APPLICATIONS

This application claims priority to Japanese Patent Application No. 2017-007310, filed on Jan. 19, 2017. The entire disclosure of Japanese Patent Application No. 2017-007310 is hereby incorporated herein by reference.

BACKGROUND

Field of the Invention

The present invention relates to a dual-bearing reel.

Background Art

A dual-bearing reel comprises a clutch mechanism that connects a spool shaft and a pinion gear and releases the connection (for example, refer to Japanese Laid-Open Patent Application No. 2012-24037). When0 the clutch mechanism is in a clutch on state, the spool shaft and the pinion gear are connected, and the spool shaft and the pinion gear integrally rotate with each other. As a result, the rotation of the handle is transmitted to the spool via a rotation transmission mechanism. On the other hand, when the clutch mechanism is in a clutch off state, the connection between the spool shaft and the pinion gear is released, and the spool shaft and the pinion gear can be rotated relative to each other. As a result, even if the spool is rotated at a high speed during casting, the rotation of the spool is not transmitted to the handle.

Since the above-described pinion gear is meshed with a drive gear that integrally rotates with the handle, there is a risk that the pinion gear will receive a load from the drive gear and flex.

SUMMARY

Therefore, an object of the present invention is to prevent flexing of the pinion gear.

The dual-bearing reel according to an aspect of the present invention comprises a reel body, a pinion gear, a first bearing member, a spool shaft, a spool, and a clutch mechanism. The pinion gear is tubular. The first bearing member supports the outer perimeter surface of a first end portion of the pinion gear. The spool shaft extends through the inside of the pinion gear. In addition, the spool shaft is rotatably supported in the reel body. The spool is attached to the spool shaft. The clutch mechanism can be switched between a clutch on state and a clutch off state. When the clutch mechanism is in the clutch on state, the clutch mechanism connects the pinion gear and the spool shaft. Additionally, when the clutch mechanism is in the clutch off state, the clutch mechanism releases the connection between the pinion gear and the spool shaft. The spool shaft comprises a support portion. In the clutch on state, the support portion supports the inner perimeter surface of a second end portion of the pinion gear.

According to this configuration, while the outer perimeter surface of the first end portion of the pinion gear is supported by the first bearing member, the inner perimeter surface of the second end portion of the pinion gear is supported by the support portion of the spool shaft. In this manner, since the inner perimeter surface of the pinion gear is supported, it is possible to prevent flexing of the pinion gear. In addition, since the contact locations between the pinion gear and the spool shaft are increased compared with the prior art, the noise transmission ratio is improved, and the sensitivity is improved.

Preferably, the pinion gear comprises a central portion in which a gear portion is formed. The central portion is disposed between the first end portion and the second end portion. The second end portion of the pinion gear comprises a distal end portion and a proximal end portion that is disposed further on the central portion side than the distal end portion. The support portion supports the inner perimeter surface of the proximal end portion. According to this configuration, since the support portion supports the inner perimeter surface at the proximal end portion, which is close to the gear portion, it is possible to more effectively prevent flexing of the pinion gear.

Preferably, the dual-bearing reel further comprises a second bearing member that supports the outer perimeter surface of the spool shaft. The second bearing member is disposed further on the spool side than the pinion gear in the axial direction.

Preferably, the spool shaft further comprises a spool mounting portion to which the spool is attached. The second bearing member is disposed between the spool mounting portion and the support portion.

Preferably, the second end portion of the pinion gear is supported only by the support portion. According to this configuration, since an bearing member for supporting the second end portion of the pinion gear can be omitted, it is possible to reduce cost.

Preferably, the outer perimeter surface of the second end portion of the pinion gear does not contact the other members.

Preferably, a space is formed between the outer perimeter surface of the second end portion of the pinion gear and the reel body.

Preferably, the clutch mechanism comprises an engaging pin and an engagement recess. The engagement pin protrudes in the radial direction from the spool shaft. The engagement recess is formed in the second end portion of the pinion gear and engages with the engaging pin.

According to the present invention, it is possible to improve the strength of the pinion gear.

DETAILED DESCRIPTION OF THE EMBODIMENTS

Embodiments of the dual-bearing reel according to the present invention will be described below with reference to the drawings. The axial direction means the direction in which the spool shaft extends. Further, the radial direction is the radial direction of a circle having the spool shaft as the center thereof, and the circumferential direction is the circumferential direction of the circle having the spool shaft as the center thereof.

Dual-Bearing Reel

Figure 1:
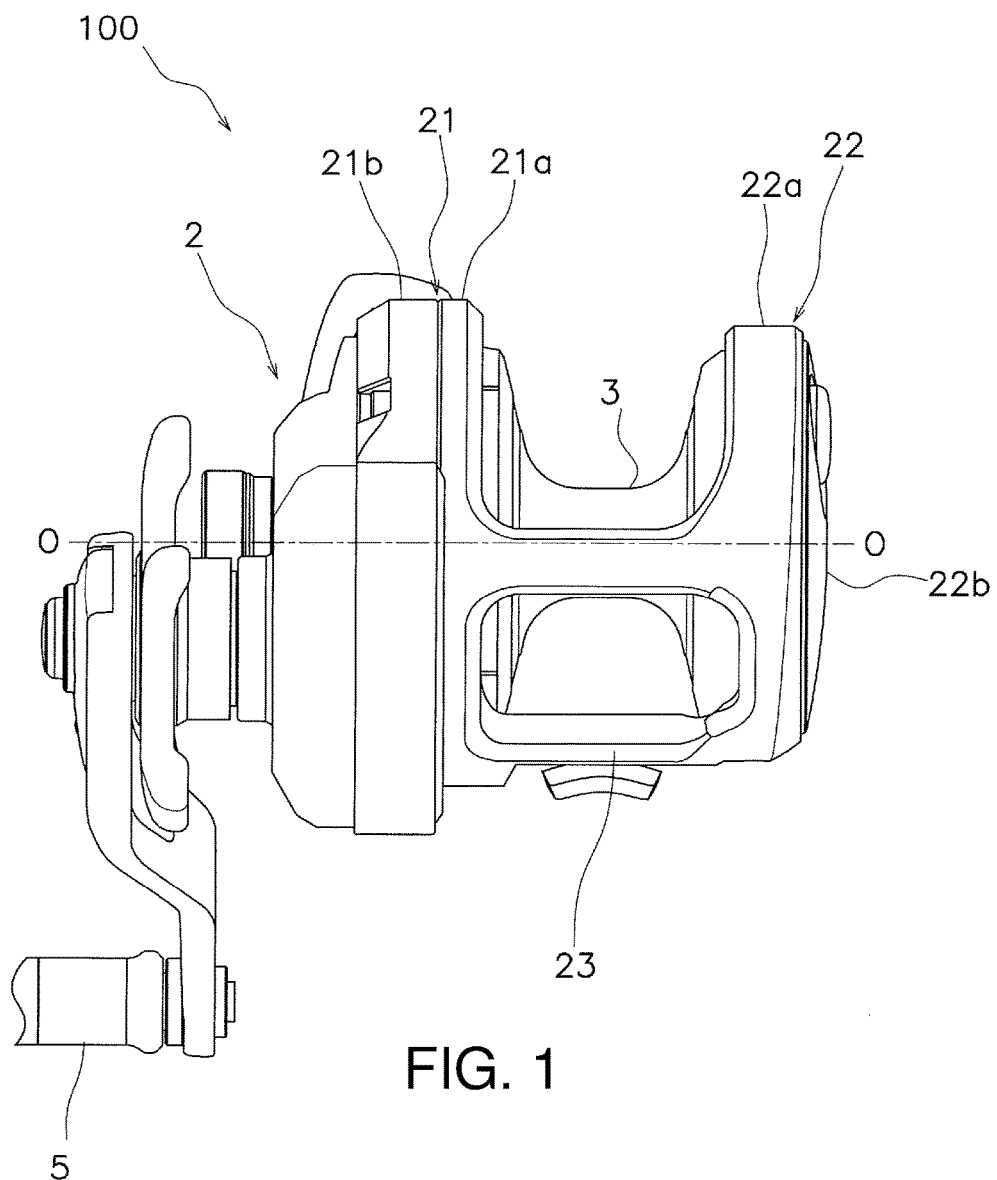
FIG. 1 is a front view of a dual bearing reel.
Figure 2:
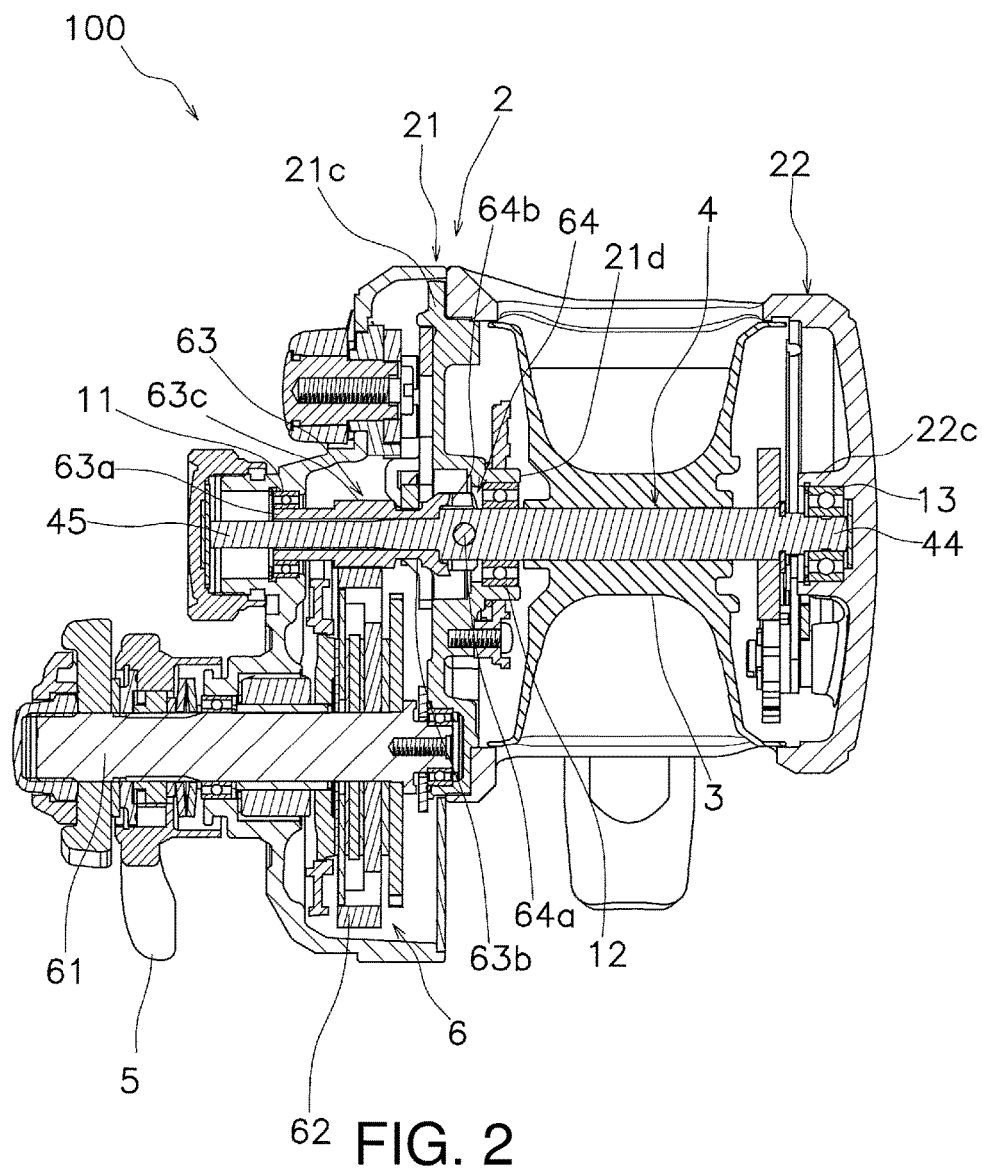
FIG. 2 is a cross-sectional view of the dual-bearing reel as seen from above in FIG. 1.

As shown in FIGS. 1 and 2, the dual-bearing reel 100 comprises a reel body 2, a spool 3, a spool shaft 4, a handle 5, and a rotation transmission mechanism 6.

Reel Body

As shown in FIG. 1, the reel body 2 comprises a first reel body portion 21 and a second reel body portion 22. The first reel body portion 21 and the second reel body portion 22 are disposed at an distance from each other in the axial direction. The first reel body portion 21 and the second reel body portion 22 are connected to each other via a plurality of connecting portions 23.

The first reel body portion 21 comprises a first side plate 21a and a first side cover 21b. As shown in FIG. 2, the first reel body portion 21 further comprises a mechanism mounting plate 21c. The first reel body portion 21 comprises a housing space inside. The rotation transmission mechanism 6 and the like are housed in this housing space.

As shown in FIG. 1, the second reel body portion 22 comprises a second side plate 22a and a second cover 22b. The first side plate 21a and the second side plate 22a are connected to each other via the connecting portions 23. The first side plate 21a, the second side plate 22a, and the connecting portions 23 are integrally formed and form a frame of the reel body 2.

Spool

The spool 3 is disposed between the first reel body portion 21 and the second reel body portion 22. In particular, the spool 3, which has a substantially cylindrical shape, extends in the axial direction. The spool 3 is rotatable relative to the reel body 2. The spool 3 is rotatably supported in the reel body 2 by the spool shaft 4.

Spool Shaft

As shown in FIG. 2, the spool shaft 4 is rotatably supported in the reel body 2. Specifically, the spool shaft 4 is rotatably supported in the first reel body portion 21 and the second reel body portion 22. Specifically, the spool shaft is rotatably supported in the reel body 2 via a bearing member, described below. The spool 3 is attached to the spool shaft 4. Thus, the spool 3 and the spool shaft 4 integrally rotate.

Figure 3:
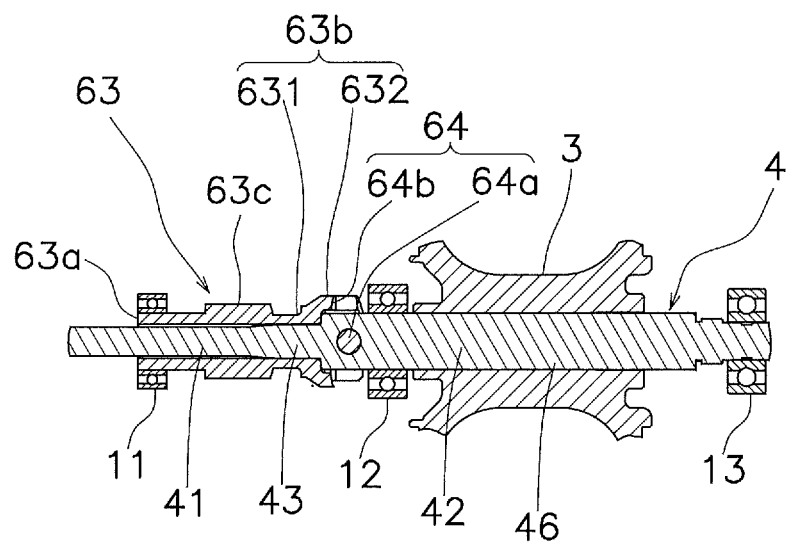
FIG. 3 is a cross-sectional view of the pinion gear and the spool shaft in the clutch on state.

As shown in FIG. 3, the spool shaft 4 comprises a first portion 41 that extends inside the pinion gear 63 and a second portion 42 that extends inside the spool 3. The spool 3 is attached to this second portion 42. The outer diameter of the first portion 41 is smaller than the outer diameter of the second portion 42. The outer diameter of the first portion 41 is slightly smaller than the inner diameter of the pinion gear 63 so that the outer perimeter surface of the first portion 41 does not come in contact with the inner perimeter surface of the pinion gear 63.

The support shaft 4 further comprises a support portion 43. The support portion 43 is a portion of the first portion 41, and the outer diameter thereof is slightly larger than the other portions of the first portion 41. The support portion 43 forms the end portion of the first portion 41 on the second portion 42 side. Accordingly, if the pinion gear 63 moves in a direction away from the spool 3 (left side in FIG. 3), the support portion 43 moves relatively to the outside of the pinion gear 63.

In addition, the spool shaft 4 further comprises a spool mounting portion 46. The spool 3 is attached to this spool mounting portion 46. The spool mounting portion 46 is a portion of the second portion 42.

Handle

As shown in FIG. 1, the handle 5 is a member for rotating the spool 3 and is rotatably mounted on the first reel body portion 21. When the handle 5 is rotated, the spool 3 is rotated via the rotation transmission mechanism 6.

Rotation Transmission Mechanism

As shown in FIG. 2, the rotation transmission mechanism 6 is a mechanism for transmitting the rotation of the handle 5 to the spool shaft 4. The rotation transmission mechanism 6 comprises a drive shaft 61, a drive gear 62, a pinion gear 63, and a clutch mechanism 64. The drive shaft 61 integrally rotates with the handle 5. The drive gear 62 integrally rotates with the drive shaft 61.

The pinion gear 63 meshes with the drive gear 62. The pinion gear 63 is disposed inside the first reel body portion 21. The pinion gear 63 is tubular. The spool shaft 4 extends through the inside of this pinion gear 63.

As shown in FIG. 3, the pinion gear 63 comprises a first end portion 63a, a second end portion 63b, and a central portion 63c. The first end portion 63a is an end portion on the side away from the spool 3, and the second end portion 63b is an end portion on the side close to the spool 3. Also, the central portion 63c is the portion between the first end portion 63a and the second end portion 63b. A gear portion is formed on the outer perimeter surface of the central portion 63c. The gear portion formed in this central portion 63c meshes with the drive gear 62.

The second end portion 63b comprises a proximal end portion 631 and a distal end portion 632. The proximal end portion 631 is disposed further on the central portion 63c side than the distal end portion 632 (i.e., closed to the central portion 63c). The distal end portion 632 extends from the proximal end portion 631 toward the spool 3. The inner diameter of the distal end portion 632 is larger than the inner diameter of the proximal end portion 631.

The clutch mechanism 64 is configured to transmit and cut off the rotation of the pinion gear 63 to the spool shaft 4. That is, the clutch mechanism 64 is configured to be switchable between the clutch on state and the clutch off state. When the clutch mechanism 64 is in the clutch on state, the pinion gear 63 and the spool shaft 4 are connected and integrally rotate. Further, when the clutch mechanism 64 is in the clutch off state, the connection between the pinion gear 63 and the spool shaft 4 is released.

Specifically, the clutch mechanism 64 is formed from an engagement pin 64a and an engagement recess 64b. The engagement pin 64a protrudes in the radial direction from the spool shaft 4. Specifically, the engagement pin 64a extends through the spool shaft 4 in the radial direction. The engagement recess 64b is formed in the second end portion 63b of the pinion gear 63. Specifically, the engagement recess 64b is formed in the distal end portion 632 of the second end portion 63b. The engagement recess 64b is opened toward the spool 3 in the axial direction. The engagement recess 64b is configured to engage the engagement pin 64a.

Figure 4:
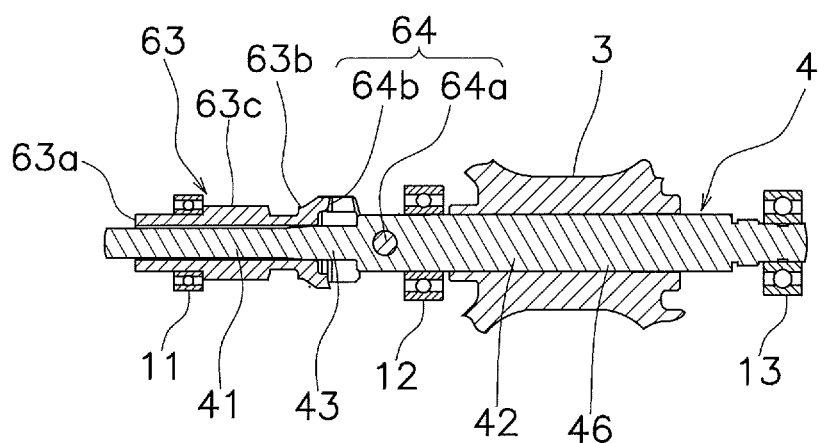
FIG. 4 is a cross-sectional view of the pinion gear and the spool shaft in the clutch off state.

When the clutch mechanism 64 is in the clutch on state, the engagement pin 64a engages with the engagement recess 64b. By the engagement of the engagement pin 64a and the engagement recess 64b, the pinion gear 63 and the spool shaft 4 are integrally rotated, and, as a result, the rotation of the pinion gear 63 is transmitted to the spool shaft 4. On the other hand, as shown in FIG. 4, if the pinion gear 63 moves in a direction away from the engagement pin 64a, the clutch mechanism 64 is brought into the clutch off state, and the engagement between the engagement pin 64a and the engagement recess 64b is released. As a result, the pinion gear 63 and the spool shaft 4 rotate relatively, and the rotation of the pinion gear 63 is not transmitted to the spool shaft 4.

Bearing Member

As shown in FIG. 2, the dual-bearing reel 100 comprises a plurality of bearing members. The first bearing member 11 supports the outer perimeter surface of the first end portion 63a of the pinion gear 63. In addition, the first bearing member 11 is attached to the first reel body portion 21. Specifically, the first bearing member 11 is attached to the first cover 21b of the first reel body portion 21. Moreover, the first bearing member 11 is the only bearing member that supports the pinion gear 63. That is, while the first end portion 63a of the pinion gear 63 is supported by the first bearing member 11, the second end portion 63b of the pinion gear 63 is not supported by an bearing member.

As shown in FIG. 3, the inner perimeter surface of the second end portion 63b of the pinion gear 63 is supported by the support portion 43 of the spool shaft 4. Specifically, the support portion 43 supports the inner perimeter surface of the proximal end portion 631 of the second end portion 63b. In addition, when the clutch mechanism 64 is in the clutch on state, the support portion 43 of the spool shaft 4 supports the inner perimeter surface of the second end portion 63b of the pinion gear 63. That is, in the clutch on state, the outer perimeter surface of the support portion 43 contacts the inner perimeter surface of the second end portion 63b of the pinion gear 63. The outer diameter of the support portion 43 supporting the second end portion 63b of the pinion gear 63 is substantially the same as the inner diameter of the pinion gear 63. Moreover, the outer perimeter surface of the portion other than the support portion 43 of the first portion 41 of the spool shaft 4 is not in contact with the inner perimeter surface of the second end portion 63b of the pinion gear 63.

In this manner, when the clutch mechanism 64 is in the clutch on state, the first end portion 63a of the pinion gear 63 is supported by the first bearing member 11, and the second end portion 63b of the pinion gear 63 is supported by the support portion 43 of the spool shaft 4. In other words, the outer perimeter surface of the first end portion 63a of the pinion gear 63 is supported, and the inner perimeter surface of the second end portion 63b of the pinion gear 63 is supported. The second end portion 63b of the pinion gear 63 is supported only by the support portion 43. That is, the outer perimeter surface of the second end portion 63b of the pinion gear 63 is not supported by a bearing member. The outer perimeter surface of the second end portion 63b of the pinion gear 63 is also not in contact with the other members. Accordingly, a space is formed between the outer perimeter surface of the second end portion 63b of the pinion gear 63 and the reel body 2.

As shown in FIG. 4, when the clutch mechanism 64 is in the clutch off state, only the first end portion 63a of the pinion gear 63 is supported, and the second end portion 63b is not supported. In the clutch off state, the pinion gear 63 moves in a direction away from the spool 3. Accordingly, the support portion 43 of the spool shaft 4 moves relatively to the outside of the pinion gear 63, and the support of the second end portion 63b by the support portion 43 is released.

As shown in FIG. 2, the second bearing member 12 supports the outer perimeter surface of the spool shaft 4. The second bearing member 12 is disposed further on the spool 3 side than the second end portion 63b of the pinion gear 63. Specifically, the second bearing member 12 is disposed between the spool mounting portion and the supporting portion 43. In addition, the second bearing member 12 is disposed between the spool 3 and the pinion gear 63. The second bearing member 12 is attached to the first reel body portion 21. Specifically, the second bearing member 12 is attached to the mechanism mounting plate 21c of the first reel body portion 21. The mechanism mounting plate 21c comprises a boss portion 21d that protrudes toward the spool 3. The second bearing member 12 is mounted in this boss portion 21d.

The third bearing member 13 supports the outer perimeter surface of the first end portion 44 of the spool shaft 4. The third bearing member 13 is attached to the second reel body portion 22. Specifically, the second reel body portion 22 comprises a boss portion 22c that protrudes toward the spool 3. The third bearing member 13 is attached to this boss portion 22c. Moreover, the second end portion 45 of the spool shaft 4 is not supported. That is, the second bearing member 12 and the third bearing member 13 are the only bearing members that support the spool shaft 4.

In the axial direction, the second bearing member 12 and the third bearing member 13 are disposed on the opposite side of each other with respect to the spool 3. That is, in the axial direction, the second bearing member 12, the spool 3, and the third bearing member 13 are arranged in that order.

Operation of the Dual-Bearing Reel

The operation of the dual-bearing reel 100 will now be described. As shown in FIG. 4, at the time of casting in which a fishing line is paid out from the spool 3, the clutch mechanism 64 is brought into the clutch off state. Accordingly, while the spool shaft 4 integrally rotates with the spool 3 in the casting (line unwinding) direction, this rotation is not transmitted to the pinion gear 63. Therefore, the rotation of the spool 3 is not transmitted to the handle 5 via the rotation transmission mechanism 6.

As shown in FIG. 3, when the pinion gear 63 is moved to the spool 3 side (right side in FIG. 3) and the clutch mechanism 64 is brought into the clutch on state, the engaging pin 64a engages the engagement recess 64b. As a result, the pinion gear 63 and the spool shaft 4 integrally rotate. Therefore, the rotation of the handle 5 is transmitted to the spool 3 via the rotation transmission mechanism 6.

In this clutch on state, the outer perimeter surface of the first end portion 63a of the pinion gear 63 is supported by the first bearing member 11. Further, the inner perimeter surface of the second end portion 63b of the pinion gear 63 is supported by the support portion 43 of the spool shaft 4. Therefore, the outer perimeter surface of the support portion 43 is in contact with the inner perimeter surface of the second end portion 63b. Moreover, the outer perimeter surface of the second end portion 63b of the pinion gear 63 is not supported by a bearing member.

As shown in FIG. 4, when the clutch mechanism 64 is in the clutch off state, the outer perimeter surface of the first end portion 63a of the pinion gear 63 is supported by the first bearing member 11. On the other hand, the inner perimeter surface of the second end portion 63b of the pinion gear 63 is supported by the support portion 43 of the spool shaft 4. That is, the outer perimeter surface of the support portion 43 is not in contact with the inner perimeter surface of the second end portion 63b. A portion of the support portion 43 may be in contact with the inner perimeter surface, but most of the support portion 43 is preferably not in contact with the inner perimeter surface.

Although each embodiment of the present invention has been presented heretofore, the present invention is not limited to the embodiments, and various modifications can be made without departing from the scope of the invention For example, in the above-described embodiment, the clutch mechanism 64 is formed from an engagement pin 64a and an engagement recess 64b, but the configuration of the clutch mechanism 64 is not limited thereto.

In addition, in the spool shaft 4 of the present embodiment, the first portion 41 has a smaller outer diameter than the second portion 42, but the configuration of the spool shaft 4 is not limited thereto. For example, the first portion 41 may have the same outer diameter as the second portion 42, or may have a larger outer diameter than the second portion 42.

Figure 5:
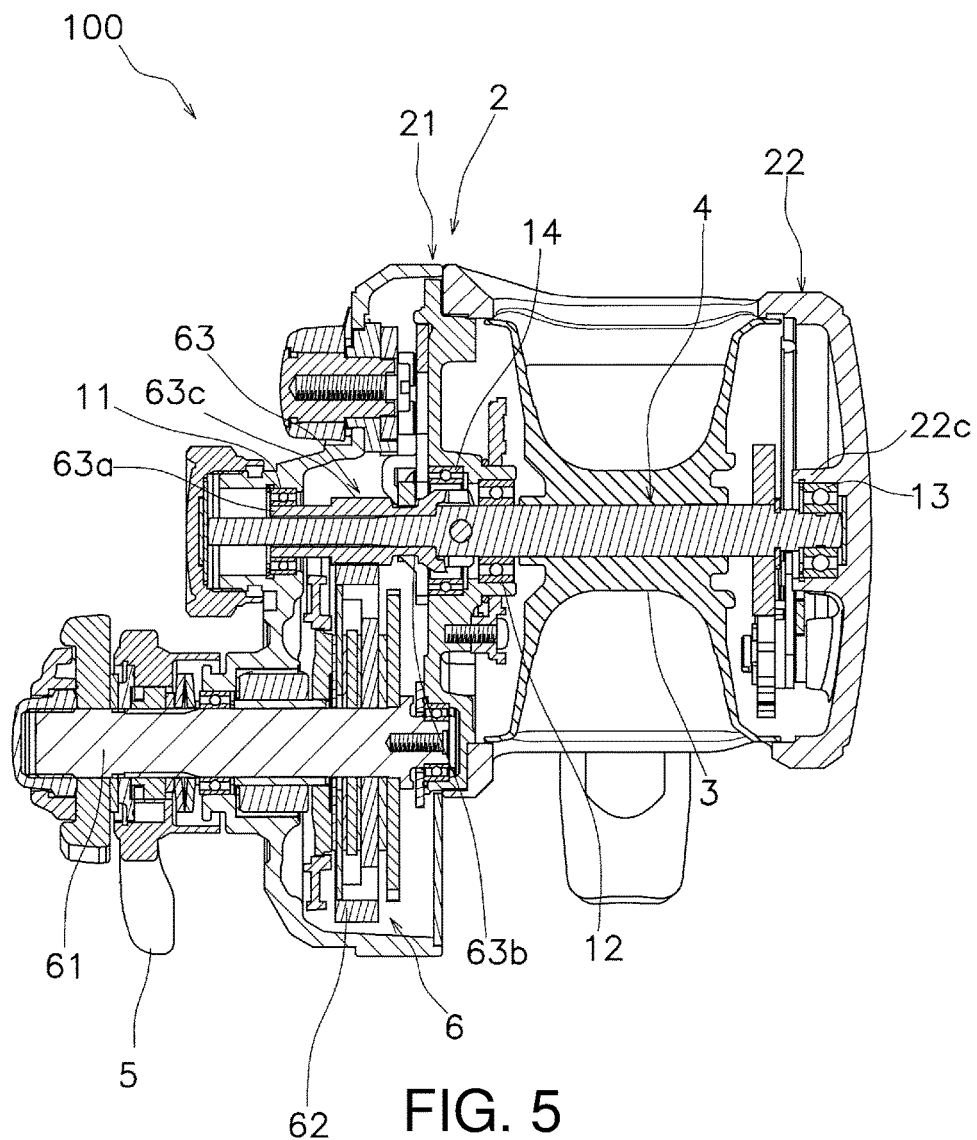
FIG. 5 is a view of a dual-bearing reel according to a modified example corresponding to FIG. 2.

Furthermore, as shown in FIG. 5, a fourth bearing member 14 that does not contact the pinion gear 63 may be disposed on the radially outer side of the second end portion 63b of the pin 63. Specifically, the fourth bearing member 14 is disposed on the radially outward side of the distal end portion 632 of the second end portion 63b. However, this fourth bearing member 14 does not contact the pinion gear 63.

Furthermore, instead of the fourth bearing member 14, a bush, or the like (not shown) that does not contact the pinion gear 63 may be disposed on the radially outer side of the second end portion 63b of the pinion gear 63. Moreover, the fourth bearing member 14 and the bush, etc., limit the backlash of the pinion gear 63 when the first reel body portion 21 is removed from the reel body 2 and a space is formed between the outer perimeter surface of the second end portion 63b of the pinion gear 63 and inner perimeter surface of the fourth bearing member 14. In this manner, the fourth bearing member 14 and the bush, etc., do not support the pinion gear 63 in a rotating state.

What is claimed is:

1. A dual-bearing reel, comprising
a reel body;
a tubular pinion gear;
a first bearing member supporting an outer perimeter surface of a first end portion of the pinion gear;
a spool shaft extending through an interior of the pinion gear and rotatably supported in the reel body;
a spool attached to the spool shaft; and
a clutch mechanism configured to switch between a clutch on state to connect the pinion gear and the spool shaft, and a clutch off state to release the connection between the pinion gear and the spool shaft,
the spool shaft including a support portion configured to support an inner perimeter surface of a second end portion of the pinion gear in the clutch on state.

2. The dual-bearing reel recited in claim 1, wherein
the pinion gear comprises a central portion disposed between the first end portion and the second end portion and having a gear portion formed thereon,
the second end portion of the pinion gear comprises a distal end portion, and a proximal end portion disposed closer to the central portion than the distal end portion, and
the support portion supports an inner perimeter surface of the proximal end portion.

3. The dual-bearing reel recited in claim 1, further comprising
a second bearing member supporting an outer perimeter surface of the spool shaft,
the second bearing member being disposed closer to the spool than the pinion gear in the axial direction.

4. The dual-bearing reel recited in claim 3, wherein
the spool shaft further comprises a spool mounting portion attached to the spool, and
the second bearing member is disposed between the spool mounting portion and the support portion.

5. The dual-bearing reel recited in claim 3, wherein
an outer perimeter surface of the second end portion of the pinion gear is separated from first and second axial bearing members.

6. The dual-bearing reel recited in claim 1, wherein
the second end portion of the pinion gear is supported only by the support portion.

7. The dual-bearing reel recited in claim 1, wherein
a space is disposed between an outer perimeter surface of the second end portion of the pinion gear and the reel body.

8. The dual-bearing reel recited in claim 1, wherein
the clutch mechanism comprises an engaging pin protruding in a radial direction from the spool shaft, and an engagement recess disposed in the second end portion of the pinion gear, the engaging pin configured to engage the engagement recess.

* * * * *